US012544407B2

(12) United States Patent
O'Heeron et al.

(10) Patent No.: US 12,544,407 B2
(45) Date of Patent: Feb. 10, 2026

(54) FIBROBLAST CELL THERAPY FOR TREATMENT OF OSTEOPOROSIS

(71) Applicant: FIBROBIOLOGICS, INC., Houston, TX (US)

(72) Inventors: Pete O'Heeron, Houston, TX (US); Thomas Ichim, San Diego, CA (US)

(73) Assignee: FibroBiologics, Inc., Houston, TX (US)

( * ) Notice: Subject to any disclaimer, the term of this patent is extended or adjusted under 35 U.S.C. 154(b) by 908 days.

(21) Appl. No.: 17/594,752

(22) PCT Filed: Apr. 27, 2020

(86) PCT No.: PCT/US2020/030063
§ 371 (c)(1),
(2) Date: Oct. 28, 2021

(87) PCT Pub. No.: WO2020/223155
PCT Pub. Date: Nov. 5, 2020

(65) Prior Publication Data
US 2022/0241346 A1   Aug. 4, 2022

Related U.S. Application Data

(60) Provisional application No. 62/839,716, filed on Apr. 28, 2019.

(51) Int. Cl.
*A61K 35/33* (2015.01)
*A61K 38/17* (2006.01)
*A61K 38/45* (2006.01)
*C12N 5/074* (2010.01)
*C12N 5/077* (2010.01)
*C12N 9/12* (2006.01)

(52) U.S. Cl.
CPC ............ *A61K 35/33* (2013.01); *A61K 38/177* (2013.01); *A61K 38/1793* (2013.01); *A61K 38/45* (2013.01); *C12N 5/0656* (2013.01); *C12N 9/1276* (2013.01); *C12Y 207/07049* (2013.01); *C12N 5/0696* (2013.01); *C12N 2506/1307* (2013.01)

(58) Field of Classification Search
CPC ...... A61K 38/45; A61K 35/33; A61K 38/177; A61K 38/1793; C12N 5/0656; C12N 9/1276; C12N 2506/1307; C12N 5/0696; C12Y 207/07049; A61P 19/10
See application file for complete search history.

(56) References Cited

U.S. PATENT DOCUMENTS 6,432,710 B1 * 8/2002 Boss, Jr. ............... A61L 31/005
                                                            435/363
2011/0274665 A1    11/2011 Maslowski

FOREIGN PATENT DOCUMENTS

WO    WO-2008111831 A1 *  9/2008  ......... G01N 33/5044

OTHER PUBLICATIONS

Rao et al. Omentin-1 prevents inflammation-induced osteoporosis by downregulating the pro-inflammatory cytokines. Bone Research (2018),6:9. (Year: 2018).*
Nazrun et al. The Anti-Inflammatory Role of Vitamin E in Prevention of Osteoporosis. Advances in Pharmacological Sciences (2012), Article ID 142702, 7 pages. (Year: 2012).*
Kamada et al. Establishment of ultra long-lived cell lines by transfection of TERT into normal human fibroblast TIG-1 and their characterization. Cell Biol. Int. (2012) 36, 519-527. (Year: 2012).*
Yamamoto et al. "Direct conversion of human fibroblasts into functional osteoblasts by defined factors" PNAS, May 12, 2015, vol. 112, No. 19, pp. 6152-6157.
Atkins et al. "RANKL Expression Is Related to the Differentiation State of Human Osteoblasts" Journal of Bone and Mineral Research, Jun. 2003, vol. 18, No. 6, pp. 1088-1098.
Office Action issued Sep. 19, 2025 in corresponding Canadian Application No. 3,138,513, 5 pages.
Yamamoto et al., "Direct phenotypic conversion of human fibroblasts into functional osteoblasts triggered by a blockade of the transforming growth factor-β signal." Scientific Reports, 8:8463, 2018, pp. 1-11.
DeVries et al., "Gingival fibroblasts are better at inhibiting osteoclast formation than periodontal ligament fibroblasts." Journal of Cellular Biochemistry, 98(2), 2006, pp. 370-382.
Csobonyeiova et al., "iPS cell technologies and their prospect for bone regeneration and disease modeling: A mini review." Journal of Advanced Research, 8, 2017, pp. 321-327.
Smith et al., "hTERT Extends the Life of Human Fibroblasts without Compromising Type I Interferon Signaling." Plos One, 8(3), 2013, pp. 1-11.

* cited by examiner

*Primary Examiner* — Sean C. Barron
(74) *Attorney, Agent, or Firm* — Norton Rose Fulbright US LLP

(57) ABSTRACT

Embodiments of the disclosure include methods and compositions related to modulation of bone using particular fibroblasts. The modulation includes reducing osteoclast activity and/or activation and/or stimulating osteoblast activity. In particular cases, bone is modulated in an individual with a bone condition, such as osteoporosis. Particular fibroblasts may be delivered to reduce inflammatory cytokine production including RANK ligand.

28 Claims, No Drawings

FIBROBLAST CELL THERAPY FOR TREATMENT OF OSTEOPOROSIS

This application is a national phase application under 35 U.S.C. § 371 that claims priority to International Application No. PCT/US2020/030063 filed Apr. 27, 2020, which claims priority to U.S. Provisional Patent Application Ser. No. 62/839,716, Apr. 28, 2019, which is incorporated by reference herein in its entirety.

TECHNICAL FIELD

Embodiments of the disclosure include at least the fields of cell biology, molecular biology, and medicine.

BACKGROUND

It is known that formation of bone occurs through the steps of: a) synthesis of extracellular protein matrix (osteoid) by osteoblasts; b) matrix mineralization by coating the protein matrix with a layer of mineral, and predominantly calcium phosphate in the form of crystals of hydroxyapatite; c) and bone remodeling, which is a process that occurs throughout human life.

Bone remodeling is essential to maintain the integrity of the skeleton and serves as storage for mineral homeostasis [1]. Via an interactive process called coupling, this process is balanced by the functions of bone-resorbing osteoclasts and bone-forming osteoblasts in early adulthood. When the bone loses its mineral content and density and develops osteopenia, this culminates in osteoporosis, which is associated with a risk of bone fractures [2].

Osteoporosis is normally related to increasing age, consistent with the fact that most of the older population is affected by this condition. It has been shown that genetics could be another explanation for the pathogenesis of osteoporosis. The results of laboratory studies have indicated that osteoporosis is caused by an imbalance of the coupling interactive process, with increased bone resorption relative to bone formation. In this regard, the imbalance is a consequence of changes at the cellular level, by which osteoclast development is enhanced but osteoblast differentiation is insufficient because of impaired activity and enhanced apoptosis [3, 4]

Osteoclasts are giant cells formed by cell-cell fusion of monocyte-macrophage precursors and characterized by multiple nuclei, abundant vacuoles, and lysosomes; they play a key role in bone development and remodeling, which also involves osteoblasts and osteocytes. Osteoclasts differentiate from monocytes under the influence of macrophage colony stimulating factor (M-CSF) and receptor activator of nuclear factor k-B ligand (RANKL). Osteoclast function is stimulated by triggering of receptor activator of nuclear factor-kappa B (RANK) expressed on the membrane of osteoclasts by RANKL. In the healthy bone, the main source of RANKL are osteoblasts expressing it as a surface receptor in response to bone-resorbing factors and it is cleaved into a soluble molecule (sRANKL) by metalloproteinase (MMPs). Moreover, RANKL is expressed also by stromal cells, lymphocytes, and macrophages that can support osteoclast function during inflammation. Osteoprotegerin (OPG) is a soluble receptor of RANKL and is secreted by osteoblasts and stromal cells to inhibit RANK stimulation and osteoclastogenesis induced by RANKL. The binding of M-CSF to its colony-stimulating factor 1 receptor (c-fms) on osteoclast progenitors upregulates expression of RANK in these cells and promotes osteoclastogenesis. Osteoclast differentiation includes cell polarization with formation of ruffled membrane and sealing of the osteoclasts to the bone to form a sealing zone, or clear zone, that separates the resorption lacunae from the surround. This is the secretion site of acid, tartrate-resistant acid phophatase (TRAP), cathepsins, and MMPs leading to demineralization of the inorganic component of the bone and hydrolysis of its organic components. Then, coupling mechanisms promote the differentiation and recruitment of osteoblasts at the resorption lacunae, where they secrete the organic component of bone that is then mineralized by hydroxyapatite. Some osteoblasts entrapped within the matrix become osteocytes and secrete sclerostin that inhibits osteoblast function and terminates the remodeling cycle. Sclerostin expression is inhibited when osteocytes are exposed to mechanical forces, which targets bone remodeling to areas of maximal strain.

The present disclosure satisfies a long felt need in the art of treatment of osteoporosis and other bone medical conditions.

BRIEF SUMMARY

The disclosure pertains to the field of treatment or prevention of one or more medical conditions associated with bone. In a specific case, the disclosure concerns treatment of osteoporosis, more specifically, to the use of cellular therapy for treatment of osteoporosis. In specific cases, the disclosure pertains to the field of inhibition of osteoclast formation and/or activity, as well as the stimulation of osteoblast activity.

In particular embodiments, treatment of osteoporosis using fibroblasts is disclosed. In one embodiment, therapeutic fibroblast populations are administered as a means of reducing excessive osteoclast activation and/or stimulating osteoblast activity in individuals in need thereof. In one embodiment, fibroblasts are administered that have been transfected to allow for enhanced homing subsequent to systemic administration, wherein the homing is selecting to osteogenic niche(s) at or within the bone. In specific embodiments, the transfected gene is CXCR4. In another embodiment, fibroblasts are administered to reduce inflammatory cytokine production including RANK ligand and thus suppress bone resorption as a result of aging and/or chronic disease.

In one embodiment, there is a method of inhibiting osteoclast activity or activation in an individual, comprising the step of providing to the individual an effective amount of fibroblast cells. The fibroblasts may be particular, such as the fibroblasts having activity of inhibiting receptor activator of RANK ligand production. The fibroblasts may express a marker selected from the group consisting of CD73, CD56, CD140, CD105, CD90, and a combination thereof. The fibroblasts may comprise recombinant C—X—C chemokine receptor type 4 (CXCR4) and/or recombinant telomerase reverse transcriptase (hTERT). The fibroblasts may be dedifferentiated, such as by: (1) comprising recombinant expression of octamer-binding transcription factor 4 (OCT-4); NANOG; sex determining region Y-box 2 (SOX-2); or a combination thereof; (2) upon exposure to and/or transfection by one or more DNA methyltransferase inhibitors, one or more histone deacetylase inhibitors, and/or one or more inhibitors of glycogen synthase kinase 3 (GSK-3); (3) by transfection of cytoplasm from a stem cell (such as a pluripotent stem cell); or (4) a combination thereof. The fibroblasts may be administered to the individual systemically or locally, such as at a bone defect, including bone loss or a fracture of any kind. They may be administered with one or more anti-inflammatory agents, including one or more inhibitors of NF-kappa B. The individual has or is at risk for having osteoporosis, in some cases, and the individual may be of a certain age. In some cases, the individual is asymptomatic for bone loss.

In one embodiment, there is a method of treating a bone disease or disorder in an individual, comprising the step of providing to the individual an effective amount of fibroblast cells. The individual may or may not have osteoporosis. The fibroblasts may have activity of inhibiting RANK ligand production. The fibroblasts may express a marker selected from the group consisting of CD73, CD56, CD140, CD105, CD90, and a combination thereof and/or the fibroblasts may comprise recombinant C-X-C chemokine receptor type 4 (CXCR4) and/or recombinant telomerase reverse transcriptase (hTERT). The fibroblasts may be dedifferentiated, such as by: (1) comprising recombinant expression of octamer-binding transcription factor 4 (OCT-4); NANOG; sex determining region Y-box 2 (SOX-2); or a combination thereof; (2) upon exposure to and/or transfection by one or more DNA methyltransferase inhibitors, one or more histone deacetylase inhibitors, and/or one or more inhibitors of glycogen synthase kinase 3 (GSK-3); (3) by transfection of cytoplasm from a stem cell (such as a pluripotent stem cell); or (4) a combination thereof. The fibroblasts may be administered systemically or locally, including with or without one or more anti-inflammatory agents, including an inhibitor of NF-kappa B. The individual may be of a certain age.

It is specifically contemplated that any limitation discussed with respect to one embodiment of the disclosure may apply to any other embodiment of the invention. Furthermore, any composition of the disclosure may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Summary, Detailed Description, and Claims.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure. Additional objects, features, aspects and advantages of the present invention will be set forth in part in the description which follows, and in part will be obvious from the description or may be learned by practice of the methods of the disclosure. Various embodiments of the disclosure will be described in sufficient detail to enable those skilled in the art to practice the invention, and it is to be understood that other embodiments may be utilized and that changes may be made without departing from the scope of the disclosure. The following detailed description is, therefore, not be taken in a limiting sense, and the scope of the present invention is best defined by the appended claims.

While various embodiments of the disclosure have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the disclosure described herein may be employed.

DETAILED DESCRIPTION

In keeping with long-standing patent law convention, the words "a" and "an" when used in the present specification in concert with the word comprising, including the claims, denote "one or more." Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

Throughout this application, the term "about" is used according to its plain and ordinary meaning in the area of cell and molecular biology to indicate that a value includes the standard deviation of error for the device or method being employed to determine the value.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments.

A variety of aspects of this disclosure can be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range as if explicitly written out. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. When ranges are present, the ranges may include the range endpoints.

The term "subject," as used herein, may be used interchangeably with the term "individual" and generally refers to an individual in need of a therapy. The subject can be a mammal, such as a human, dog, cat, horse, pig or rodent. The subject can be a patient, e.g., have or be suspected of having or at risk for having a disease or medical condition related to bone. For subjects having or suspected of having a medical condition directly or indirectly associated with bone, the medical condition may be of one or more types. The subject may have a disease or be suspected of having the disease. The subject may be asymptomatic. The subject may be of any gender. The subject may be of a certain age, such as at least 30, 35, 40, 45, 50, 55, 60, 65, 70, 75, 80, 85, 90, 95, or 100 or more.

I. Embodiments of Methods of the Disclosure

Methods of the disclosure relate to modulation of bone formation including suppressing bone resorption or loss as a result of any cause, including as a result of aging and/or chronic disease and/or fracture. The modulation may include enhancing or stimulating osteoblast activity and/or the modulation may include reducing osteoclast activity or activation, including excessive osteoclast activity or activation. An individual in need of reducing osteoclast activation may occur as a result of a pathological condition, an endocrine abnormality, aging, and/or osteoporosis. Methods include treatment or prevention of any bone disorder, bone loss, and/or bone disease, including at least osteoporosis.

An excess of osteoclast activity leads to pathological bone loss and can be detected in conditions such as osteoporosis, rheumatoid arthritis, and other autoimmune diseases, such as in which a key role has been ascribed to inflammatory cytokines and adaptive immunity. The disclosure encompasses treatment of these conditions by administration of fibroblasts, and/or derivatives of fibroblasts (such as apoptotic bodies, vesicles of any kind including exosomes, conditioned media from culturing of fibroblasts) through their ability to suppress inflammation and/or modulation of the osteoclast to osteoblast activity. One aspect of the disclosure includes at least the previously unknown ability of fibroblasts when therapeutically administered to inhibit osteoclast formation and/or activity and/or to enhance or stimulate osteoblast activity.

An individual may be subject to methods of the disclosure as a measure of preventative bone loss. The individual may be subject to methods of the disclosure upon reaching a certain age, such as about 35, 40, 45, 50, 55, 60, 65, 70, 75, 80, 85, 90, 95, or 100 or greater, with or without a symptom of bone loss. An individual may be subject to methods of the disclosure following onset of a symptom of bone loss of any kind, including osteoporosis. As one example, an individual may be subject to methods and compositions of the disclosure upon having back pain, caused by a fractured or collapsed vertebra; loss of height over time; a stooped posture; and/or a bone fracture that occurs much more easily than expected. A person at risk for osteoporosis may utilize methods and compositions of the disclosure, such as an individual with a family history; having too much thyroid hormone that can cause bone loss; overactive parathyroid and adrenal glands; lowered sex hormone levels that tend to weaken bone; an individual that has had gastrointestinal surgery; having low calcium intake; having an eating disorder; having long-term use of oral or injected corticosteroid medications; having celiac disease; having inflammatory bowel disease; having kidney or liver disease; having cancer; having lupus; having multiple myeloma; having rheumatoid arthritis; having a sedentary lifestyle; having excessive alcohol consumption; and/or being a tobacco user.

Methods of the disclosure include at least stimulating osteoblast activity and/or inhibiting osteoclast activation by administering to an individual in need thereof an effective amount of fibroblast cells. The administering may be systemic, local, or both. Although the administering route may be by any means, in some cases a systemic infusion of an effective amount of fibroblast cells is provided to the individual.

When provided to the individual, in some embodiments the fibroblasts may be administered systemically at a concentration of approximately 10,000-3,000,000 cells per kilogram of recipient body weight. In one example, the fibroblasts are administered systemically at a concentration of approximately $1 \times 10^5$-$2 \times 10^6$ cells per kilogram of recipient body weight. In other examples, the cells are delivered at a concentration of range of $1 \times 10^5$-$2 \times 10^6$, $5 \times 10^5$-$2 \times 10^6$, $1 \times 10^6$-$2 \times 10^6$ cells per kilogram of recipient body weight, and so forth. The fibroblasts may be administered systemically at a concentration of approximately 1 million cells per kilogram of recipient body weight, in specific cases. In any event, the fibroblasts may be administered together with one or more agents capable of inhibiting inflammation. One example of an anti-inflammatory agent is an NF-kappa B inhibitor, such as a sirtuin, including resveratrol.

In one embodiment, there is a method of treatment of osteoporosis comprising administering to an individual in need of osteoporosis treatment a therapeutically effective amount of fibroblasts. Any fibroblasts used in any method of the disclosure may possess a younger biological age as compared to the recipient, in some cases. A younger biological age may be induced by transfection with one or more agents capable of repairing and/or restoring telomere length. In some cases, the fibroblasts are transfected with hTERT in order to reduce biological age. In particular embodiments, the fibroblasts are dedifferentiated in order to reduce biological age, including dedifferentiation by transfection into the fibroblasts of one or more factors selected from the group consisting of: a) OCT-4; b) NANOG; c) SOX-2; and d) a combination thereof. The dedifferentiation may be induced by addition of one or more agents selected from the group consisting of: a) a DNA methyltransferase inhibitor; b) a histone deacetylase inhibitor; c) an inhibitor of GSK-3; and d) a combination thereof. The dedifferentiation may be accomplished by transfection of cytoplasm from a cell or group of cells younger than the fibroblast, such as a pluripotent stem cell that may be derived from somatic cell nuclear transfer or derived from the process of parthenogenesis. The pluripotent stem cell may be generated as an inducible pluripotent stem cell.

The disclosure concerns at least the administration of fibroblasts that possess the ability to induce inhibition of osteoclast activity and/or osteoclast numbers in an individual in need thereof. In one embodiment, fibroblasts are systemically delivered, for example through intravenous and/or intra-arterial routes. Fibroblasts may be cultured before administration in a manner to enhance their activity for inhibition of monocyte-osteoclast transition. In one embodiment, the fibroblasts for use in the methods of the disclosure are cells of fibroblastic shape and plastic adherence that are subjected to one or more compositions comprised of one or more particular media and/or one or more agents such that the composition(s) are capable of enhancing the ability of fibroblasts to inhibit osteoclast formation and/or activity. In particular embodiments of the disclosure, methods are directed to a population of cells wherein the cells are fibroblasts of any type and the fibroblasts become modified such that they have reduced interleukin (IL)-12 production and/or enhanced IL-10 production and may be utilized in a therapeutic capacity.

Some neoplasia involving immune cells, such as multiple myeloma, are characterized by intense focal bone erosions ascribed to high expression of RANKL by stromal cells and, in some embodiments, myeloma cells. Bone metastases of solid cancer, too, may be osteolytic, and prostatic cancer may promote bone resorption through the expression of a soluble form of RANKL. Embodiments of the disclosure encompass treatment of these conditions.

Several inflammatory cytokines, such as TNF-alpha, IL-1, IL-6, and M-CSF upregulate RANKL expression and stimulate osteoclasts function. A key role is played by type 17 T helper (Th17) cells secreting IL-17 [5], that induces the expression of RANKL in osteoblasts and synovial cells. Moreover, IL-17 supports recruitment of several types of immune cells that contribute to the bone damage and produce cytokines and other proinflammatory molecules supporting osteoclast differentiation and activity.

Th17 is a critical modulator in the pathogenesis of estrogen-deficient osteoporosis, which supports the notion that estrogen-deficient osteoporosis is a complex interplay between estrogen, osteoclastogenic cytokines and osteoclasts [6, 7]. Accordingly, in one embodiment of the disclosure, fibroblast administration is performed to inhibit production of at least IL-17, which in turn would reduce the process of osteoporosis and help to restore generation of osteoblasts and suppression of osteoclasts.

In certain embodiments, the fibroblasts may be of any kind, including placental fibroblasts or foreskin fibroblasts, for example. In other embodiments, cells other than fibroblasts are modified such that they have reduced IL-12 production and enhanced IL-10 production. Embodiments of the disclosure provide means of utilizing fibroblasts as allogeneic therapeutic cells for the treatment of osteoporosis through modification of culture conditions in order to decrease inflammatory mediators produced by the fibroblasts and enhance production of anti-inflammatory mediators.

In one embodiment of the disclosure, as part of some of the methods the fibroblasts are extracted from sources with lower immunogenicity (e.g. placental fibroblasts, etc.). In another embodiment, fibroblasts are cultured ex vivo and subjected to agents such as inflammatory agents, which without being restricted to mechanism, to stimulate production of one or more factors that inhibit osteoclast formation and activity. The reduction in osteoclast activity may be exemplified by inhibiting the ability of fibroblasts to suppress bone resorption in models of osteoporosis such as ovariectomized animal models of osteoporosis.

In specific embodiments, the disclosure provides methods for assessment of osteoclast inhibition activity to be performed, e.g., quantifying the ability to modulate bone resorption. Co-culturing of fibroblasts (in one case, that have been treated with interferon gamma) may occur together with osteoclasts on hydroxyapatite plates. In certain embodiments, one or more parameters of the mixed lymphocyte reaction that indicate modulation in osteoclast proliferation, cytokine secretion, and cytotoxicity are determined. Methods for quantifying osteoclast proliferation, cytokine secretion, and cytotoxicity are well known in the art. In certain embodiments, modulation of osteoclast activity can be determined by quantifying the secretion of one or more cytokines comprising TNF-alpha, Interferon gamma, IL-1, IL-2, IL-6, IL-7, IL-8, IL-12, IL-15, IL-17, IL-33, or a combination thereof.

In one embodiment of the disclosure, modified fibroblasts are administered to an individual for treatment of an inflammatory disorder or endocrine disorder resulting in osteoporosis. In some embodiments of the disclosure, fibroblast cells are cultured ex vivo and subjected to conditions that enhance their ability to inhibit osteoclasts, and then the fibroblasts are utilized, such as to stimulate anti-inflammatory and/or osteoblast stimulatory properties. Additional embodiments are directed to methods of administration of the cells to an individual in need thereof for the purpose of treating an autoimmune and/or inflammatory condition associated with reduction in bone density. In the present disclosure the practitioner is directed to systems, methods, and compositions for reducing the osteoclastic activity of cells to be used in cellular transplantation therapy. In general embodiments, a population of cells is subjected to one or more compositions comprising one or more types of media and/or one or more agents capable of reducing the immunogenicity of the population of cells. In particular embodiments of the disclosure, methods are directed to a population of cells wherein the cells comprise at least fibroblasts.

Embodiments of the disclosure provide means of utilizing fibroblasts as allogeneic therapeutic cells through modification of culture conditions in order to increase activity of osteoblasts. In one embodiment of the disclosure, fibroblasts are extracted from sources with lower immunogenicity (e.g. placental fibroblasts, etc.). In another embodiment, fibroblasts are subjected to RANK-ligand, such as upon culture ex vivo, which without being restricted to mechanism, has been demonstrated by the inventors to reduce immunogenicity. The reduction in immunogenicity is exemplified by inhibiting the ability of the fibroblasts to evoke alloreactive T cell responses, in specific embodiments. In specific embodiments of the disclosure, these modified fibroblast cells are universal donor fibroblasts.

In addition to using methods of the disclosure, to improve their bone health an individual may also have good nutrition; regular exercise; appropriate levels of calcium and Vitamin D; and/or combine strength training exercises with weight-bearing and balance exercises.

II. Fibroblasts and Derivatives and Exosomes Thereof

Embodiments of the present disclosure are directed to systems and methods for the use of fibroblast cells (autologous, allogeneic, syngeneic, or xenogeneic with respect to the individual receiving the cells) for modulation of osteoclasts and/or osteoblasts, including for treatment of any bone disorder such as osteoporosis. Methods and compositions of the disclosure encompass certain manipulated cells for the treatment of inflammatory and autoimmune conditions causing osteoporosis. In particular, the cells include at least fibroblasts of any kind.

In specific embodiments, the fibroblasts are capable of proliferating at one doubling per 36 hours or shorter. The fibroblasts may be capable of inhibiting RANK ligand production from a population of endotoxin-activated monocytes by more than 50% in a standard culture. In some cases, the standard culture is 100,000 monocytes in a 96 well plate stimulated with 5 micrograms per ml of endotoxin and cultured for 48 hours in the presence of a substantially equal number of fibroblasts. The fibroblasts may be selected for having expression of one or more markers and/or for lacking expression of one or more markers.

The fibroblasts may be plastic adherent. In some cases, the fibroblasts are provided to the individual having a recombinant gene encoding a protein capable of enhancing homing to the bone osteogenic niche. In some cases, the recombinant gene encodes for CXCR4.

Means of manipulation of fibroblasts are encompassed herein, as well as fibroblasts of different tissue origins, which actively inhibit inflammatory and/or autoimmune processes. In one embodiment of the disclosure, fibroblasts are utilized for their ability to inhibit immune responses and also utilized as a cellular therapy for prevention and/or treatment of autoimmune conditions. In one embodiment, allogeneic (or xenogeneic or syngeneic) fibroblasts are administered to an individual in a non-manipulated manner (for example, without prior exposure to one or more particular agents, such as RANK-ligand but selected from sources naturally characterized by immune modulatory activity, such as placental fibroblasts or adipose tissue-associated fibroblasts, for example. In other embodiments of the disclosure, any fibroblasts are cultured under conditions capable of inducing retro-differentiation so as to endow an immature phenotype for the fibroblasts, wherein the immature phenotype correlates with enhanced anti-inflammatory and/or immune modulatory potential. In some embodiments of the disclosure, fibroblast cells that have been dedifferentiated may be utilized for immunomodulation to express one or more markers selected from the group consisting of Telomerase, Nanog, Sox2, beta-III-Tubulin, NF-M, MAP2, APP, GLUT, NCAM, NeuroD, Nurr1, GFAP, NG2, Olig1, Alkaline Phosphatase, Vimentin, Osteonectin, Osteoprotegrin, Osterix, Adipsin, Erythropoietin, SM22-alpha, HGF, c-MET, alpha-1-Antriptrypsin, Ceruloplasmin, AFP, PEPCK 1, BDNF, NT-4/5, TrkA, BMP2, BMP4, FGF2, FGF4, PDGF, PGF, TGFalpha, TGFbeta, VEGF and a combination thereof.

In particular cases, the fibroblasts express one or more markers selected from the group consisting of: a) CD73; b) CD56; c) CD140; d) CD105; e) CD90; and f) a combination thereof. The fibroblasts may be derived from a source selected from the group of tissues consisting of: a) adipose; b) omentum; c) subintestinal mucosa; d) placenta; e) cord blood; f) Wharton's jelly; g) bone marrow; h) peripheral blood; i) hair follicle; j) skin; k) cutis; l) tonsil; m) peripheral blood; n) menstrual blood; o) thymus; and p) a combination thereof.

In one embodiment of the disclosure, fibroblasts to be used for treatment of osteoporosis that are genetically engineered, for example to express: a) one or more homing molecules to the osteogenic niche; b) one or more anti-inflammatory molecules such as Fas ligand, TGF-beta, IL-4, IL-10, HLA-G, indolamine 2,3 deoxygenase, galectin family members, Galectin 3, arginase, and/or IL-20. Any of the genes described herein or active portions thereof may be cloned into mammalian expression constructs comprising promoter sequences enabling expression in fibroblast cells such as the CMV promoter. Examples of suitable constructs include, but are not limited to pcDNA3, pcDNA3.1 (+/−), pGL3, PzeoSV2 (+/−), pDisplay, pEF/myc/cyto, pCMV/myc/cyto (each of which is commercially available from Invitrogen, for example), or the pSH expression vector that enables a regulated polynucleotide expression in human foreskin cells. Examples of retroviral vector and packaging systems are those commercially available from Clontech, San Diego, Calif., USA, including Retro-X vectors pLNCX and pLXSN, which permit cloning into multiple cloning sites and the transgene is transcribed from CMV promoter. Vectors derived from Mo-MuLV are also included such as pBabe, where the transgene will be transcribed from the 5'LTR promoter. After completing plasmid transfection fibroblasts may be harvested by a means allowing for detachment from tissue culture plates, for example, by trypsinization and transferred to either a 6-well (Nunc, Denmark) or a 24-well plate (Nunc) for proliferation. Approximately 3 days post-transfection, the cell media is changed to media suitable for proliferation and expansion of modified fibroblasts. One example is Neurobasal A (NBA) proliferation medium comprising Neurobasal-A (Invitrogen), 1% D-glucose (Sigma Aldrich), 1% Penicillin/Streptomycin/Glutamine (Invitrogen), 2% B27 supplement with Retinoic acid (Invitrogen), 0.2% EGF (Peprotech, USA), 0.08% FGF-2 (Peprotech), 0.2% Heparin (Sigma Aldrich, USA) and Valproic acid (Sigma Aldrich) to a concentration of 1 μM. The media is then subsequently changed, such as thrice weekly, and cells are re-plated regularly (for example, 2-8 times up to a maximum of weekly re-plating, becoming more regular as colonies began to develop) to remove non-reprogrammed cells until widespread colony formation is achieved. Various quality control means are known in the art for practitioners of the disclosure to perform clinical administration of the cells. Example criteria for qualification of the cells includes marker identification using means such as flow cytometry, viability, endotoxin content, as well as assessment for microbial and mycoplasma contamination.

In one embodiment of the disclosure, fibroblasts are cultured ex vivo using means known in the art for preserving viability and proliferative ability of fibroblasts. The disclosure provides for the modification of known culture techniques to decrease recognition of fibroblasts by the recipient immune system. In one embodiment fibroblasts are cultured in conditions that lack xenogeneic components, such as fetal calf serum. Xenogeneic components are known to trigger immunological reactions, including elicitation of antibody and T cell reactions. In specific embodiments, the disclosure encompasses the substitution of fetal calf serum with human platelet rich plasma, platelet lysate, umbilical cord blood serum, autologous serum, and/or defined cytokine mixes as an additional feature to reduce the immunogenicity of fibroblasts.

For the suppression of osteoclast activity, in some cases exosomes collected from fibroblasts may be administered as a substitute for fibroblasts, or may be administered together with fibroblasts to enhance their activity. In one embodiment of the disclosure, exosomes are purified from fibroblasts by obtaining fibroblast conditioned medium, concentrating the conditioned medium, subjecting the concentrated conditioned medium to size exclusion chromatography, selecting UV absorbent fractions at 220 nm, and concentrating fractions containing exosomes.

Exosomes, also referred to as "particles," may comprise vesicles or a flattened sphere limited by a lipid bilayer. The particles may comprise diameters of 40-100 nm. The particles may be formed by inward budding of the endosomal membrane. The particles may have a density of about 1.13-1.19 g/ml and may float on sucrose gradients. The particles may be enriched in cholesterol and sphingomyelin, and lipid raft markers such as GM1, GM3, flotillin and the src protein kinase Lyn. The particles may comprise one or more proteins present in fibroblast, such as a protein characteristic or specific to the fibroblasts or fibroblast conditioned media. They may comprise RNA, for example miRNA. The particles may possess one or more genes or gene products found in fibroblasts or medium which is conditioned by culture of fibroblasts. The particle may comprise molecules secreted by the fibroblasts. Such a particle, and combinations of any of the molecules comprised therein, including in particular proteins or polypeptides, may be used to supplement the activity of, or in place of, the fibroblasts or medium conditioned by the fibroblasts for the purpose of for example treating or preventing a disease. The particle may comprise a cytosolic protein found in cytoskeleton e.g., tubulin, actin and actin-binding proteins, intracellular membrane fusions and transport, e.g., annexins and rab proteins, signal transduction proteins, e.g., protein kinases, 14-3-3 and heterotrimeric G proteins, metabolic enzymes, e.g., peroxidases, pyruvate and lipid kinases, and enolase-1 and the family of tetraspanins, e.g., CD9, CD63, CD81 and CD82. In particular, the particle may comprise one or more tetraspanins. The particles may comprise mRNA and/or microRNA. The particle may be used for any of the therapeutic purposes that the fibroblasts or fibroblast conditioned media may be put to use.

Methods of isolating exosomes from regenerative cells are known in the literature and are incorporated by reference [8, 9]. Freeze dry methods of storing exosomes and conditioned media are also known in the literature and are incorporated by reference [10].

In one embodiment, fibroblast exosomes, or particles may be produced by culturing fibroblasts in a medium to condition them. The fibroblasts may be derived from human umbilical tissue derived cells, or other tissues possessing or associated with regenerative features, which possess markers selected from a group comprising of CD90, CD73 and CD105. The medium may comprise DMEM. The DMEM may be such that it does not comprise phenol red. The medium may be supplemented with insulin, transferrin, or selenoprotein (ITS), or any combination thereof. It may comprise FGF2. It may comprise PDGF AB. The concentration of FGF2 may be about 5 ng/ml FGF2. The concentration of PDGF AB may be about 5 ng/ml. The medium may comprise glutamine-penicillin-streptomycin or b-mercaptoethanol, or any combination thereof. The cells may be cultured for about 1, 2, 3, 4, 5, 6, 7, 8, 9, 10 days or more, for example 3 days. The conditioned medium may be obtained by separating the cells from the medium. The conditioned medium may be centrifuged, for example at 500 g. it may be concentrated by filtration through a membrane. The membrane may comprise a >1000 kDa membrane. The conditioned medium may be concentrated about 50 times or more. The conditioned medium may be subject to liquid chromatography such as HPLC. The conditioned medium may be separated by size exclusion. Any size exclusion matrix such as Sepharose may be used. As an example, a TSK Guard column SWXL, 6×40 mm or a TSK gel G4000 SWXL, 7.8×300 mm may be employed. The eluent buffer may comprise any physiological medium such as saline. It may comprise 20 mM phosphate buffer with 150 mM of NaCl at pH 7.2. The chromatography system may be equilibrated at a flow rate of 0.5 ml/min. The elution mode may be isocratic. UV absorbance at 220 nm may be used to track the progress of elution. Fractions may be examined for dynamic light scattering (DLS) using a quasi-elastic light scattering (QELS) detector. Fractions which are found to exhibit dynamic light scattering may be retained. For example, a fraction which is produced by the general method as described above, and which elutes with a retention time of 11-13 minutes, such as 12 minutes, is found to exhibit dynamic light scattering. The $r_h$ of particles in this peak is about 45-55 nm. Such fractions comprise fibroblast particles such as exosomes.

For the practice of the methods of the disclosure, in some embodiments, foreskin fibroblasts may be re-suspended in ex vivo culture in medium supplemented with one or more agents to decrease immunogenicity, serum and/or serum-replacement. Serum can be of any source including fetal bovine serum, human serum or serum replacement (for example, replacement with human platelet lysate. In some embodiments, human serum or serum replacement is utilized in order to provide a xenogeneic-free environment for the foreskin feeder cells. Subsequent to culture the human foreskin feeder cells of the present disclosure are capable of forming monolayers when attached to a solid phase such as a tissue culture plate. This characteristic of the human foreskin feeder cells of the present disclosure makes these cells suitable universal donors because of high replicative ability and responsiveness to treatment with RANK-ligand with respect to reduction of immunogenicity. One of skill in the art will appreciate that fibroblasts from different sources may possess different reduction of osteoclast activity at differing concentrations of interferon gamma and/or RANK ligand.

One embodiment of the disclosure concerns the isolation procedure of fibroblasts from tissues utilizes an enzymatic digestion process. Many enzymes are known in the art to be useful for the isolation of individual cells from complex tissue matrices to facilitate growth in culture. As discussed above, a broad range of digestive enzymes for use in cell isolation from tissue is available to the skilled artisan. Ranging from weakly digestive (e.g., deoxyribonucleases and the neutral protease, dispase) to strongly digestive (e.g., papain and trypsin), such enzymes are available commercially. A non-exhaustive list of enzymes compatible herewith includes mucolytic enzyme activities, metalloproteases, neutral proteases, serine proteases (such as trypsin, chymotrypsin, or elastase), and/or deoxyribonucleases. Presently considered are enzyme activities selected from metalloproteases, neutral proteases, mucolytic activities, and a combination thereof. For example, collagenases are known to be useful for isolating various cells from tissues. Deoxyribonucleases can digest single-stranded DNA and can minimize cell-clumping during isolation. Enzymes can be used alone or in combination. Serine protease are preferably used in a sequence following the use of other enzymes as they may degrade the other enzymes being used. The temperature and time of contact with serine proteases must be monitored. Serine proteases may be inhibited with alpha 2 microglobulin in serum and therefore the medium used for digestion is preferably serum-free. EDTA and DNase are commonly used and may improve yields or efficiencies. Preferred methods involve enzymatic treatment with for example collagenase and dispase, or collagenase, dispase, and hyaluronidase, and such methods are provided wherein in certain preferred embodiments, a mixture of collagenase and the neutral protease dispase are used in the dissociating step. More preferred are those methods which employ digestion in the presence of at least one collagenase from *Clostridium histolyticum*, and either of the protease activities, dispase and thermolysin. Still more preferred are methods employing digestion with both collagenase and dispase enzyme activities. Also preferred are methods which include digestion with a hyaluronidase activity in addition to collagenase and dispase activities. The skilled artisan will appreciate that many such enzyme treatments are known in the art for isolating cells from various tissue sources. For example, the LIBERASE BLENDZYME (Roche) series of enzyme combinations of collagenase and neutral protease are very useful and may be used in the instant methods. Other sources of enzymes are known, and the skilled artisan may also obtain such enzymes directly from their natural sources. The skilled artisan is also well-equipped to assess new, or additional enzymes or enzyme combinations for their utility in isolating the cells of the disclosure. Particular enzyme treatments are 0.5, 1, 1.5, or 2 hours long or longer. In other particular embodiments, the tissue is incubated at 37° C. during the enzyme treatment of the dissociation step. Diluting the digest may also improve yields of cells as cells may be trapped within a viscous digest. While the use of enzyme is presently preferred, it is not required for isolation methods as provided herein. Methods based on mechanical separation alone may be successful in isolating the instant cells from the umbilicus as discussed above. The cells can be resuspended after the tissue is dissociated into any culture medium as discussed herein above. Cells may be resuspended following a centrifugation step to separate out the cells from tissue or other debris. Resuspension may involve mechanical methods of resuspending, or simply the addition of culture medium to the cells. Providing the growth conditions allows for a wide range of options as to culture medium, supplements, atmospheric conditions, and relative humidity for the cells. A preferred temperature is 37° C., however the temperature may range from about 35° C. to 39° C. depending on the other culture conditions and desired use of the cells or culture.

Presently encompassed are methods which provide cells that require no exogenous growth factors, except as are available in the supplemental serum provided with the Growth Medium, for example. Also provided herein are methods of deriving umbilical cells capable of expansion in the absence of particular growth factors. The methods are similar to the method above, however they require that the particular growth factors (for which the cells have no requirement) be absent in the culture medium in which the cells are ultimately resuspended and grown in. In this sense, the method is selective for those cells capable of division in the absence of the particular growth factors. Particular cells in some embodiments are capable of growth and expansion in chemically-defined growth media with no serum added. In such cases, the cells may require certain growth factors, which can be added to the medium to support and sustain the cells. Particular factors to be added for growth on serum-free media include one or more of FGF, EGF, IGF, and PDGF. In more particular embodiments, two, three or all four of the factors are add to serum free or chemically defined media. In other embodiments, LIF is added to serum-free medium to support or improve growth of the cells.

Also provided are methods wherein the cells can expand in the presence of from about 5% to about 20% oxygen in their atmosphere. Methods to obtain cells that require L-valine require that cells be cultured in the presence of L-valine. After a cell is obtained, its need for L-valine can be tested and confirmed by growing on D-valine containing medium that lacks the L-isomer.

Methods are provided wherein the cells can undergo at least 25, 30, 35, or 40 doublings prior to reaching a senescent state. Methods for deriving cells capable of doubling to reach $10^{14}$ cells or more are provided. Preferred are those methods which derive cells that can double sufficiently to produce at least about $10^{14}$, $10^{15}$, $10^{16}$, or $10^{17}$ or more cells when seeded at from about $10^3$ to about $10^6$ cells/cm$^2$ in culture. Preferably these cell numbers are produced within 80, 70, or 60 days or less. In one embodiment, placental fibroblasts are isolated and expanded, and possess one or more markers selected from the group consisting of CD10, CD13, CD44, CD73, CD90, CD141, PDGFr-alpha, HLA-A, HLA-B, HLA-C, and a combination thereof. In addition, the cells do not produce one or more of CD31, CD34, CD45, CD117, CD141, or HLA-DR,DP, DQ.

REFERENCES

All patents and publications mentioned in the specification are indicative of the level of those skilled in the art to which the invention pertains. All patents and publications are herein incorporated by reference in their entirety to the same extent as if each individual publication was specifically and individually indicated to be incorporated by reference.

1. Manolagas, S.C., Birth and death of bone cells: basic regulatory mechanisms and implications for the pathogenesis and treatment of osteoporosis. Endocr Rev, 2000. 21(2): p. 115-37.
2. Zebaze, R. M., et al., Intracortical remodelling and porosity in the distal radius and post-mortem femurs of women: a cross-sectional study. Lancet, 2010. 375 (9727): p. 1729-36.
3. Marie, P. J. and M. Kassem, Osteoblasts in osteoporosis: past, emerging, and future anabolic targets. Eur J Endocrinol, 2011. 165(1): p. 1-10.
4. Pino, A. M., C. J. Rosen, and J. P. Rodriguez, In osteoporosis, differentiation of mesenchymal stem cells (MSCs) improves bone marrow adipogenesis. Biol Res, 2012. 45(3): p. 279-87.
5. Blauvelt, A. and A. Chiricozzi, The Immunologic Role of IL-17 in Psoriasis and Psoriatic Arthritis Pathogenesis. Clin Rev Allergy Immunol, 2018. 55(3): p. 379-390.
6. Zhao, R., Immune regulation of bone loss by Th17 cells in oestrogen-deficient osteoporosis. Eur J Clin Invest, 2013. 43(11): p. 1195-202.
7. Tyagi, A. M., et al., Estrogen deficiency induces the differentiation of IL-17 secreting Th17 cells: a new candidate in the pathogenesis of osteoporosis. PLoS One, 2012. 7(9): p. e44552.
8. Ding, Y., et al., Exosomes derived from human umbilical cord mesenchymal stromal cells deliver exogenous miR-145-5p to inhibit pancreatic ductal adenocarcinoma progression. Cancer Lett, 2018.
9. Safwat, A., et al., Adipose mesenchymal stem cells-derived exosomes attenuate retina degeneration of streptozotocin-induced diabetes in rabbits. J Circ Biomark, 2018. 7: p. 1849454418807827.
10. Bari, E., et al., Pilot Production of Mesenchymal Stem/Stromal Freeze-Dried Secretome for Cell-Free Regenerative Nanomedicine: A Validated GMP-Compliant Process. Cells, 2018. 7(11).

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of treating a bone disease or disorder in an individual, comprising the step of administering to the individual an effective amount of fibroblast cells, wherein the fibroblasts comprise recombinant C-X-C chemokine receptor type 4 (CXCR4).

2. A method of treating a bone disease or disorder in an individual, comprising the step of administering to the individual an effective amount of fibroblast cells, wherein the fibroblasts comprise recombinant telomerase reverse transcriptase (hTERT).

3. The method of claim 1, wherein the fibroblasts are dedifferentiated.

4. The method of claim 3, wherein the fibroblasts are dedifferentiated by comprising recombinant expression of octamer-binding transcription factor 4 (OCT-4); NANOG; sex determining region Y-box 2 (SOX-2); or a combination thereof.

5. The method of claim 3, wherein the fibroblasts are dedifferentiated upon exposure to and/or transfection by one or more DNA methyltransferase inhibitors, one or more histone deacetylase inhibitors, and/or one or more inhibitors of glycogen synthase kinase 3 (GSK-3).

6. The method of claim 3, wherein the fibroblasts are dedifferentiated by transfection of cytoplasm from a stem cell.

7. The method of claim 6, wherein the stem cell is a pluripotent stem cell.

8. The method of claim 1, wherein the fibroblasts are administered systemically or locally.

9. The method of claim 1, wherein the fibroblasts are administered with one or more anti-inflammatory agents.

10. The method of claim 9, wherein the anti-inflammatory agent is an inhibitor of NF-kappa B.

11. The method of claim 1, wherein the individual has osteoporosis.

12. The method of claim 2, wherein the individual has osteoporosis.

13. The method of claim 1, wherein the fibroblasts have activity of inhibiting Receptor activator of nuclear factor kappa-B (RANK) ligand production by osteoclasts.

14. The method of claim 2, wherein the fibroblasts have activity of inhibiting Receptor activator of nuclear factor kappa-B (RANK) ligand production by osteoclasts.

15. The method of claim 1, wherein the fibroblasts further express a marker selected from the group consisting of CD73, CD56, CD140, CD105, CD90, and a combination thereof.

16. The method of claim 2, wherein the fibroblasts further express a marker selected from the group consisting of CD73, CD56, CD140, CD105, CD90, and a combination thereof.

17. The method of claim 1, wherein the fibroblasts are dedifferentiated.

18. The method of claim 2, wherein the fibroblasts are dedifferentiated.

19. The method of claim 17, wherein the fibroblasts are dedifferentiated by comprising recombinant expression of octamer-binding transcription factor 4 (OCT-4); NANOG; sex determining region Y-box 2 (SOX-2); or a combination thereof.

20. The method of claim 18, wherein the fibroblasts are dedifferentiated by comprising recombinant expression of octamer-binding transcription factor 4 (OCT-4); NANOG; sex determining region Y-box 2 (SOX-2); or a combination thereof.

21. The method of claim 1, wherein the fibroblasts are administered systemically to the individual.

22. The method of claim 1, wherein the fibroblasts are administered locally to the individual.

23. The method of claim 2, wherein the fibroblasts are administered systemically to the individual.

24. The method of claim 2, wherein the fibroblasts are administered locally to the individual.

25. The method of claim 1, wherein the fibroblasts are administered to the individual with one or more anti-inflammatory agents.

26. The method of claim 2, wherein the fibroblasts are administered to the individual with one or more anti-inflammatory agents.

27. The method of claim 25, wherein the anti-inflammatory agent is an inhibitor of NF-kappa B.

28. The method of claim 26, wherein the anti-inflammatory agent is an inhibitor of NF-kappa B.

* * * * *